US010475090B2

(12) United States Patent
Shuvali et al.

(10) Patent No.: US 10,475,090 B2
(45) Date of Patent: Nov. 12, 2019

(54) CALCULATING USER EXPERIENCE SCORES

(71) Applicant: Hewlett Packard Enterprise Development LP, Houston, TX (US)

(72) Inventors: Haim Shuvali, Yehud (IL); Meir Ron, Yehud (IL); Amichai Nitsan, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 308 days.

(21) Appl. No.: 15/207,232

(22) Filed: Jul. 11, 2016

(65) Prior Publication Data

US 2018/0011855 A1 Jan. 11, 2018

(51) Int. Cl.
*G06Q 30/02* (2012.01)
(52) U.S. Cl.
CPC ................. *G06Q 30/0282* (2013.01)
(58) Field of Classification Search
CPC ............ G06F 17/3053; G06F 11/3409; G06F 2201/86; G06F 17/30598
USPC ........ 705/319, 12, 14.27, 2, 26.5, 26.63, 31, 705/318, 44; 707/706, 693, 723, 776; 709/204, 206, 205, 224
See application file for complete search history.

(56) References Cited

U.S. PATENT DOCUMENTS 6,959,265 B1 10/2005 Candela et al.
7,587,324 B2 9/2009 Kaiser
8,117,136 B2 2/2012 Yang
8,335,848 B2 12/2012 Wenig et al.
8,484,730 B1 7/2013 P. R.
8,504,575 B2 8/2013 Koran et al.
8,990,637 B1 3/2015 Vlachogiannis et al.
9,355,006 B2 * 5/2016 Vlachogiannis ........ G06F 9/542
2001/0044795 A1 * 11/2001 Cohen ............... G06F 17/30699
(Continued)

FOREIGN PATENT DOCUMENTS

WO WO-2014040633 A1 3/2014
WO WO2015183322 12/2015
WO WO2015187156 12/2015

OTHER PUBLICATIONS

International Search Report & Written Opinion received in PCT Application No. PCT/US2014/040903, dated Jan. 19, 2015, 11 pages.
(Continued)

*Primary Examiner* — Jay A Morrison
*Assistant Examiner* — Ken Hoang

(57) ABSTRACT

Examples relate to calculating user experience scores for applications. The examples disclosed herein collect, for each of at least two frames of each of at least two user sessions of an application, a set of user event data items representing user experiences from the perspective of a user device during a corresponding frame of the at least two frames of a user session. A frame score is calculated for each of the at least two frames in each of the at least two user sessions by analyzing the frame's set of user event data items. A user session score is calculated for each of the at least two user sessions by averaging the frame scores for the at least two frames in the user session of the at least two user sessions. A user experience score may then be calculated for the application by averaging the user session scores of each of the at least two user sessions.

18 Claims, 4 Drawing Sheets

(56) References Cited

U.S. PATENT DOCUMENTS

| | | | |
|---|---|---|---|
| 2003/0037034 A1* | 2/2003 | Daniels | G06Q 10/087 |
| 2005/0055357 A1* | 3/2005 | Campbell | G06F 8/61 |
| 2005/0188318 A1* | 8/2005 | Tamir | G06F 11/3438 715/744 |
| 2005/0188423 A1 | 8/2005 | Motsinger et al. | |
| 2008/0313650 A1 | 12/2008 | Arnquist et al. | |
| 2010/0091954 A1 | 4/2010 | Dayanidhi et al. | |
| 2010/0269044 A1* | 10/2010 | Ivanyi | G06Q 30/02 715/736 |
| 2012/0072570 A1* | 3/2012 | Jenkins | H04L 67/2823 709/224 |
| 2012/0102101 A1 | 4/2012 | Wenig et al. | |
| 2012/0166636 A1 | 6/2012 | Page et al. | |
| 2013/0002862 A1 | 1/2013 | Waring et al. | |
| 2013/0036122 A1 | 2/2013 | Cohen et al. | |
| 2015/0324271 A1 | 11/2015 | Glass et al. | |
| 2016/0065419 A1* | 3/2016 | Szilagyi | H04L 41/5067 709/224 |
| 2017/0039200 A1 | 2/2017 | Galkin et al. | |
| 2017/0052870 A1 | 2/2017 | Shuvali et al. | |
| 2018/0011855 A1 | 1/2018 | Shuvali et al. | |

OTHER PUBLICATIONS

"MobDex: Deliver More-BugSense Blog", retrieved from the Internet on Sep. 14, 2018, 3 pages. <http://blog.bugsense.com/post/45260532382/mobdex-deliver-more>.

Bugsense Inc., "MobDex: Deliver More," (Web Page), Mar. 13, 2014, 2 pages, available at http://blog.bugsense.com/post/45260532382/mobdex-deliver-more#permalink-notes.

EPO Extended European Search Report in Application No. 14893818.6, dated Dec. 1, 2017; 8 pages.

Ethnio, Inc., "Remote Usability and UX Research Tools," (Web Page), May 28, 2014, 13 pages, available at https://web.archive.org/web/20140528050334/http:/remoteresear.ch/tools.

Guo, F., "More Than Usability: The Four Elements of User Experience, Part IV," (Web Page), Nov. 25, 2013, 8 pages, available at http://www.uxmatters.com/mt/archives/2013/11/more-than-usability-the-four-elements-of-user-experience-part-iv.php#sthash.R8CVdJpI.dpuf.

Hirschauer, J., "Apdex is Fatally Flawed," (Web Page), Sep. 10, 2013, 5 pages, available at https://blog.appdynamics.com/apm/apdex-is-fatally-flawed/.

International Preliminary Report on Patentability, dated Dec. 15, 2016, in PCT Application No. PCT/US2014/040903, filed Jun. 4, 2014, 8 pages.

International Search Report & Written Opinion, dated Jan. 20, 2015, in PCT Application No. PCT/US2014/040392, filed May 30, 2014, 12 pages.

Keynote Systems, Inc., "Press Room: 2013, Obamacare Launch Provides Mission-Critical Lessons for Optimizing Web Sites," (Web Page), 2013, 2 pages, available at http://www.keynote.com/company/press_room/releases_2013/10.15.13.html.

New Relic APM, "Apdex: Measure user satisfaction", retrieved from the Internet on Dec. 6, 2018, 4 pages. <https://docs.newrelic.com/docs/apm/new-relic-apm/apdex/apdex-measure-user-satisfaction>.

New Relic, Inc., "Apdex: Measuring User Satisfaction," (Web Page), retrieved online Nov. 2, 2016, 7 pages, available at https://docs.newrelic.com/docs/apm/new-relic-apm/apdex/apdex-measuring-user-satisfaction.

New Relic, Inc., "Change Your Apdex Settings," (Web Page), retrieved online Nov. 2, 2016, 6 pages, available at https://docs.newrelic.com/docs/apm/new-relic-apm/apdex/change-your-apdex-settings.

New Relic, Inc., "View Your Apdex Score," (Web Page), retrieved online Nov. 2, 2016, 7 pages, available at https://docs.newrelic.com/docs/apm/new-relic-apm/apdex/view-your-apdex-score.

* cited by examiner

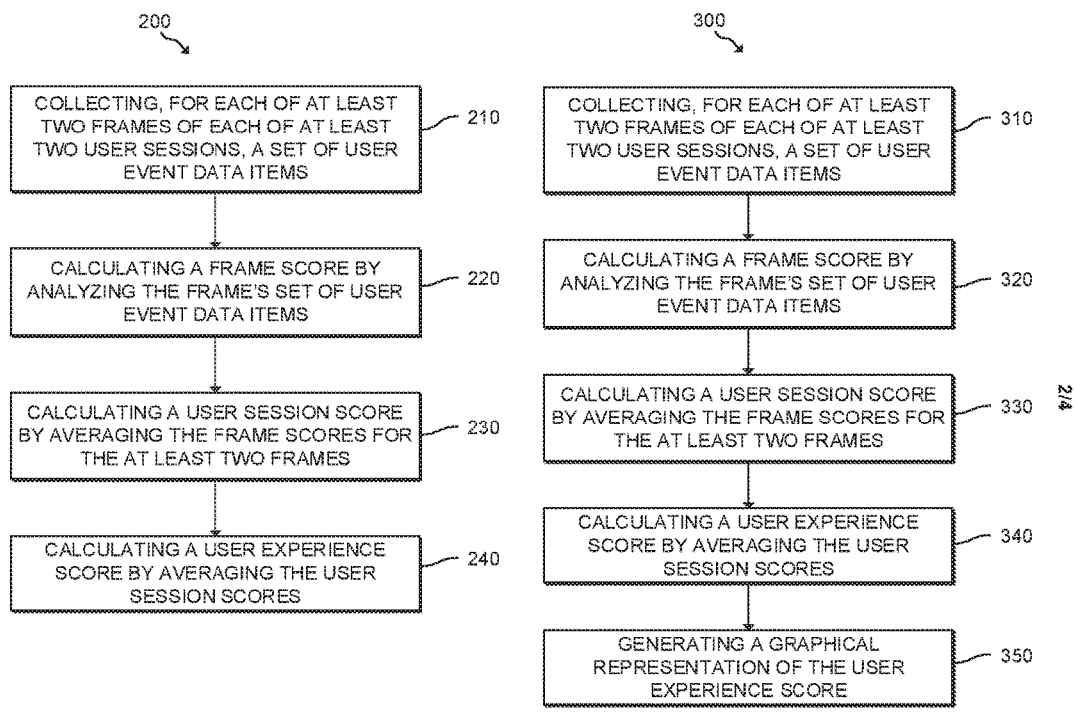

CALCULATING USER EXPERIENCE SCORES

BACKGROUND

Many services are delivered to consumers via computer applications. These applications may include several components that work in conjunction to realize the service. Those components may be distributed across various physical and virtual devices. A client side user interface component may be presented by a computer, mobile device, or other computing device. Through that user interface component, a user can initiate a series of actions carried out by the user computing device and by server side components in an attempt to implement a service. A user's experience with an application can be affected by numerous factors such as stability, performance, usability, and availability of its various components.

BRIEF DESCRIPTION OF THE DRAWINGS

The following detailed description references the drawings, wherein:

FIG. 2 is a flowchart of an example method for calculating user experience scores;

FIG. 3 is a flowchart of an example method for calculating user experience scores and generating a visual representation of user experience scores;

DETAILED DESCRIPTION

User experience, commonly abbreviated as UX, involves a person's behaviors, attitudes, and emotions about using a particular computer application or program. A user experience for an application can, as explained in more detail herein, be quantified by evaluating differences between expected events and events actually experienced when using the application. Enhancing user experience of an application can led to enhanced adoption of the product, increased retention of application users, and increased productivity for those users.

Examples disclosed herein provide a tool that calculates a score that quantifies and evaluates user experience of an application. The examples disclosed herein enable collecting, for each of at least two frames of each of at least two user sessions of an application, a set of user event data items representing user experiences from the perspective of a user device during a corresponding frame of the at least two frames of a user session. The examples enable calculating a frame score for each of the at least two frames in each of the at least two user sessions by analyzing the frame's set of user event data items. A user session score is calculated by the examples for each of the at least two user sessions by averaging the frame scores for the at least two frames in the user session of the at least two user sessions. A user experience score may be calculated by the examples for the application by averaging the user session scores of each of the at least two user sessions. In this manner, examples disclosed herein may provide a unified user experience score that considers all aspects that impact user experience, reflects the score for each user session of an application, and presents clear action items for improving end user experience.

Figure 1:
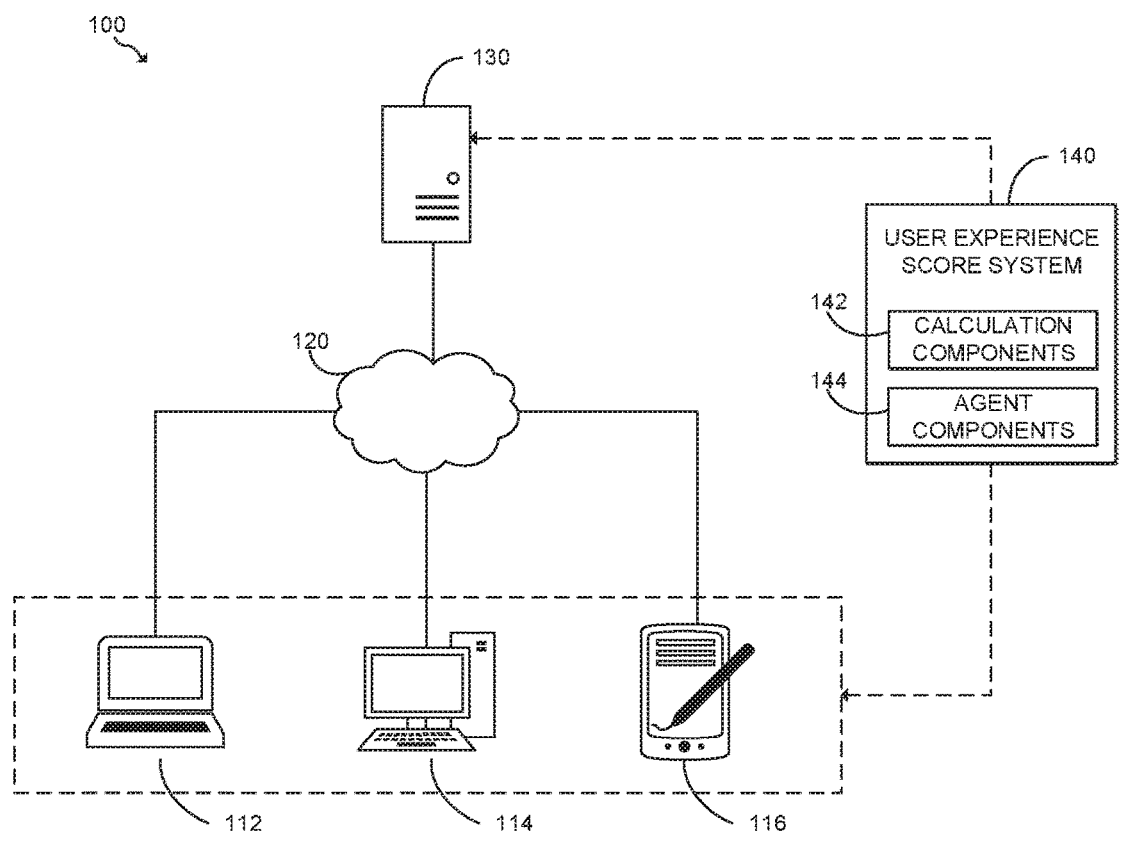
FIG. 1 is a flowchart of an example environment in which various examples may be implemented.

Referring now to the drawings, FIG. 1 is an example environment 100 in which various examples may be implemented as a user experience score system 140. As illustrated in the example of FIG. 1, environment 100 may include user devices 112, 114, and 116, and a server device 130. Each use device 112-116 may be a computing device configured to communicate requests to and receive responses from server 130. Server device 130 represents a computing device capable of receiving and responding to requests from user devices 112-116. User devices 112-116 may be any type of computing device providing a user interface through which a user can interact with a software application. For example, user computing devices 112-116 may include a laptop computing device (112), a desktop computing device (114), an all-in-one computing device, a tablet computing device (116), a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by user devices 112-116. In some examples, the software application served by server device 130 may be a web application, which may be delivered to a user via a web client, such as a web browser via a network such as the internet.

The various components (e.g., components 112-116, 130, and/or 140) depicted in FIG. 1 may be coupled to at least one other component via a network 120. Network 120 may comprise any infrastructure or combination of infrastructures that enable electronic communication between the components. For example, network 120 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, system 140 and the various components described herein may be implemented in hardware and/or a combination of hardware and programming that configures hardware. Furthermore, in FIG. 1 and other Figures described herein, different numbers of components or entities than depicted may be used.

Server 130 may serve an application for consumption by user devices 112-116. Users may interact with the application via user interfaces of user devices 112-116. Through the user interfaces, those users can take a number of actions including starting or opening a user session and interacting with user interface controls. As described in further detail herein, application events may occur as a result of those user actions. Events can include application launch, responses or results of such actions such user interface updates or changes in response to a selection of a control. Events can also include application faults such as errors and crashes.

User experience score system 140 may represent a combination of hardware and programming configured to quantify a user experience based on application events occurring during user sessions with respect to user devices 112-116. In doing so, system 140, collects user event data items from user devices 112-116. Each collected user event data item may be associated with a corresponding frame of a corresponding user session of an application served by server device 130. Multiple user event data items may be associated with a single frame. Each such user session can be associated with application environment characteristics such as a particular user, a particular user device, a user device location, an operating system, and an application version.

User event data items may include application fault data items and response data items. Each application fault data item may represent an application fault experienced during the corresponding frame of the user session, such as an error or crash. A fault may, in some examples, be fatal such as an application crash or non-fatal such as a recoverable error. Each response data item may represent a response to a user action and indicates a corresponding response time. The user actions may, for example, include application launches and actions taken with respect to the application's user interface. The response time may be a duration measured from when the user took a corresponding action and when the user experienced an expected response from the application. For example, the response time may be the duration it took a page of a web application to load on the user interface. An expected response may take the form of a user interface update indicating an error or successful response to the user action. In an example, a user action can include a user interaction with a link, a command button, a radio button, a text box, or any other user interface object.

System 140 may then calculate scores quantifying user experience, including frame scores, user session scores, and user experience scores. A frame score may be derived as a function of a set of user event data items collected for a given frame. A frame may be finite section of an application experienced by a user. For example, a frame may be a particular page of a web application or a particular given time period. A user session may have a set of frames, and a user session score may be an average of the user session's corresponding frame scores. A user experience score for an application may then be an average score of a set of user sessions for the application.

In some examples, system 140 may report selected scores. For example, reporting may include communicating a frame score, a user session score, and a user experience score as electronic messages. Reporting may include posting the scores to a repository where they can be processed to assemble a human readable report such as a dashboard. In some examples, system 140 may generate a visual representation of the scores, such as the user experience score. For example, the visual representation may include the human readable report such as the dashboard. Details of the visual representation is described in further detail below.

System 140 may be integrated entirely in server device 130 or distributed across multiple server devices not shown. In other examples or in addition, System 140 may also be distributed across server device 140 and client devices 112-116. For example, system 140 may include an agent components 144 operating on client devices 112-116 and a calculation components 142 operating on server device 130. In this example distributed model, the agent component 144 may be responsible for reporting user event data items to calculation components 142 which in turn may be responsible for processing those data items to frame scores, user session scores, and user experience scores.

The term "component", as used with reference to system 140, may refer to a combination of hardware and programming that performs a designated function. For example, the hardware of each component, for example, may include one or both of a processor and a machine-readable storage medium, while the programming is instructions or code stored on the machine-readable storage medium and executable by the processor to perform the designated function. In addition or in other examples, each component may include one or more hardware devices including electronic circuitry for implementing the functionality described below.

FIG. 2 is a flowchart of an example method 200 for calculating user experience scores. The various processing blocks and/or data flows depicted in FIG. 2 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 200 as illustrated (and described in greater detail below) is meant be an example and, as such, should not be viewed as limiting. Method 200 may be implemented in the form of executable instructions stored on a machine-readable storage medium, such as storage medium 420 described below, and/or in the form of electronic circuitry.

In an operation 210, a set of user event data items experienced from a perspective of a user device may be collected for at least two frames of a set of at least two user sessions of an application. For example, server device 130 of system 100 may collect a set of user event data items from user device 112, 114, or 116 via agent components 144. User event data items may be discrete pieces of information that are reflective of events experienced by a user during a given frame of a given user session of an application. An event may be an application event experienced from a perspective of a user device and thus from a perspective of a user. Events can include responses to user actions and application faults. Responses may include application launches and other user interface updates performed in response to user interaction with the application's user interface. Such responses can be measured by response times. From a user's perspective, a response time for a launch (launch time) may be a duration measured from when a user interacted with a user device to initiate the application until the application is in a state allowing user interaction. A response time for other user interactions may be measured from when a user interacts with the application and when a user interface is updated to provide a response. A response time may be compared with a threshold duration of time, and may be reported as positive or negative, depending on whether the response was greater than or less than the threshold duration. Application faults can include fatal application crashes and non-fatal errors. Other events may also be labeled using positive or negative, including, for example, responses to requests.

A user session may be associated with a given user, and may begin when a user launches the application and end when that application is closed. In some examples, including some web applications, a user session may be represented by a flow of user interactions starting from application launch until a browser is closed or a predetermined period of inactivity has occurred. An application may be determined to be closed when it is moved to the background of the user device for more than a threshold period. In such cases the session may stay active even when a user temporarily switches away from the application. A user session may be considered to be a fixed or variable period of time of use of that application. A user session, for example, may be deemed to be a five minute period of time such that twenty minutes of continued use would be deemed to cover four user sessions. Each user session may fall within a time period. A time period, for example, may be a day.

Furthermore, a user session may include a set of frames. A frame may be a discrete component of a user session. For example, a frame may be a particular web page in a web application. As an example, user event data items collected for a frame may include page load times perceived by the user, request response times (e.g., AJAX), HTTP errors, and JavaScript errors. The set of frames may include at least two frames.

In an operation 220, a frame score is calculated for each frame in each user session by analyzing each frame's sets of user event data items collected in the operation 210. For example, server device 130, executing calculation components 142 of user experience score system 140, may calculate the frame score for the user event data items collected from user device 112, 114, or 116. A frame score may be calculated for any frame for which user event data items were collected in the operation 210. In some examples, the frame score may be calculated by analyzing each frame and its corresponding set of user event data items.

In some examples, the frame score may be calculated by comparing a ratio of a number of user event data items labeled as positive to a total number of items in the set of user event data items. For example, positive page load times and positive AJAX request response times may be compared with the total number of user event data items, which may also include counts of various errors. Furthermore, in some examples, each category of items in the set of user event data items may be modified by a weight factor for that category. For example, in the frame score calculation, a positive page load may be weighed by a factor of 10 while an HTTP error may be weighed by a factor of 1. Weight factors for various user event category may be determined by a user policy, which may allow a user to generate scores indicative of the user's priorities in analyzing the application. An example calculation for a frame score may be represented as following example Equation 1.

$$\text{Frame Score} = \frac{10 \times (\text{page load score}) + 1 \times (\text{number of positive responses})}{10 + 1 \times (\text{number of responses}) + 2 \times (\text{number of errors})}$$

In the illustration of Equation 1, the Frame Score is a ratio of the number of positive events against the total number of events in the frame. The value 10 is assigned to the weight factor of the page load time. The page load score in Equation 1 may be a 0 if the page load time is above a threshold duration. The page load score may be a 1 if it is less than the threshold duration, indicating an acceptable response time as determined by a user policy. Similarly, a weight factor of 1 may be assigned to other responses, such as AJAX request responses. The number of positive response times may be added to the numerator of Equation 1, while the total number of responses may be added to the denominator. Furthermore, the number of errors may be assigned a weight factor of 2 and may be added to the denominator. In example Equation 1, the Frame Score may be a value between 0 and 1.

In some examples, a user event may contribute multiple times to a frame score calculation, such as that in example Equation 1. For example, a request such as an AJAX may generate a user event data item for a response time and any possible errors. If, for example, an AJAX returns both an error and a negative response time, then both the error and the negative response time may be accounted for in denominator of Equation 1. If the AJAX returns an error and a positive response time, then both may be accounted for the in denominator, while the positive response time contributes to the numerator of Equation 1. If the AJAX returns no error and a positive response, then the positive response time contributes to both the denominator and the numerator. Thus, if a user event returns more than one issue, then the multiple issues may each be considered in a frame score calculation.

In operation 230, a user session score may be calculated for each user session by averaging the frame score for the at least two frames. For example, server device 130, executing calculation components 142 of user experience score system 140, may calculate a user session score for frame scores calculated in the operation 220 for the user event data items collected from user device 112, 114, or 116. Averaging the frame scores may include operations where a modified average is calculated. That is, a modified average of frame scores may include additional mathematical operations in addition to a pure average. An example of calculation for a user session score may be represented as following example Equation 2.

$$\text{User Session Score} = \sum_{k=1}^{n} \frac{1}{n} \times (\text{frame score})_k$$

In the illustration of Equation 2, the User Session Score is an average of all frame scores of the user session, which may be calculated by taking a scaled (e.g. normalized) sum of all the frame scores. In some examples, the sum may be weighted, in that each of the frame scores in the sum may be multiplied by respective weight factors. In these examples, the average of the frame scores may be a weighted average.

In an operation 240, a user experience score for the application may be calculated by averaging the user session scores of the application calculated in the operation 230. For example, server device 130, executing calculation components 142 of user experience score system 140, may calculate a user experience score using the user session scores calculated using the frame scores calculated for the user event data items collected from user device 112, 114, or 116. The user experience score may be calculated, for example, by a scaled (e.g. normalized) sum operation such as that illustrated in example Equation 2. The user experience score may be a value between 0 and 1, or it may, for example, be scaled to a scale of 0 to 100. In some examples, the sum may be weighted, in that each of the user session scores in the sum may be multiplied by respective weight factors. In these examples, the average of the frame scores may be a weighted average. However, it should be noted that, in some examples, each user session score may contribute equally to the user experience score.

FIG. 3 is a flowchart of an example method 300 for calculating user experience scores and generating a visual representation of user experience scores. Method 300 as illustrated (and described in greater detail below) is meant be an example and, as such, should not be viewed as limiting. Method 300 may be implemented in the form of executable instructions stored on a machine-readable storage medium, such as storage medium 420 described below, and/or in the form of electronic circuitry.

Method 300 may include operations 310, 320, 330, 340, and 350. Operations 310, 320, 330, and 340 may be analogous to operations 210, 220, 230, and 240 of method 200, and may, respectively, collect a set of user event items, calculate frame scores, calculate user session scores, and calculate a user experience score.

In an operation 350, a visual representation of the user experience score may be generated. For example, the visual representation of the user experience score may be displayed via a user interface on a client computing device (e.g., user devices 112-116 of FIG. 1). In some examples, the visual representation of the use experience score may include the user experience score calculated in operation 340. Communicating the user experience score to a user may the user to identify the performance of the application over the course of the set of user sessions used to calculate the user experience score.

In some examples, the visual representation may include a score for each category of a set of categories of user event data items, where the score for each category indicates the amount of points lost in the user experience score due to that category. Thus, a user may be able to determine which causes might be affecting the performance of the application. For example, page load data items may contribute a certain proportion to a reduction in the user experience score, while fault items may contribute another proportion to a reduction in the user experience score. Take, for example, a user experience score for an application of 80. The visual representation may indicate that 15 points were deducted from the maximum score of 100 from page load data items while 5 points were deducted from fault items.

In some examples, the visual representation may include additional information to be communicated to the user. For instance, the visual representation may include session identifiers for user sessions of a set of user sessions and corresponding user session scores for each user session. Such information may allow the discerning of user sessions or groups of user sessions that contribute to the user experience score. Furthermore, the visual representation may include frame identifiers for frames of a given user session and corresponding frame scores. Thus, a user may discern the frames or groups of frames that contribute to the given user session score. Accordingly, the visual representation may present a hierarchy of scores to a user, from a user experience score to the user session scores from which the user experience score was calculated, and then to the frame scores from which the user session scores were calculated.

Figure 4:
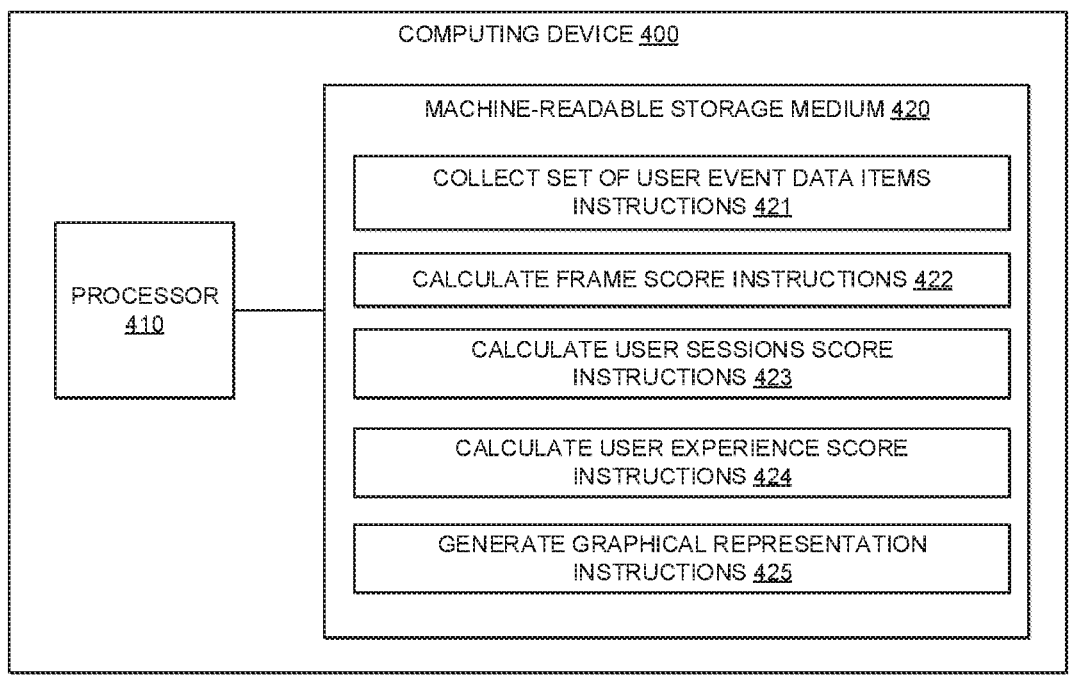
FIG. 4 is a block diagram of an example computing device for calculating user experience scores.

FIG. 4 shows a block diagram depicting an example computing device 400 for calculating user experience scores. Computing device 400 may include a server, cloud-based server, laptop computing device, a desktop computing device, an all-in-one computing device, a tablet computing device, a mobile phone, an electronic book reader, a network-enabled appliance such as a "Smart" television, and/or other electronic device suitable for the functions described herein. Computing device 400 may, for example, be analogous to server device 130 of FIG. 1.

Processor 410 may be at least one central processing unit (CPU), microprocessor, and/or other hardware device suitable for retrieval and execution of instructions stored in machine-readable storage medium 420. Processor 420 may fetch, decode, and execute program instructions 421, 422, 423, 424, 425, and/or other instructions. In other examples or in addition to retrieving and executing instructions, processor 410 may include at least one electronic circuit comprising a number of electronic components for performing the functionality of at least one of instructions 421, 422, 423, 424, 425, and/or other instructions.

Machine-readable storage medium 420 may be any electronic, magnetic, optical, or other physical storage device that contains or stores executable instructions. In some implementations, machine-readable storage medium 420 may be a non-transitory storage medium, where the term "non-transitory" does not encompass transitory propagating signals. Machine-readable storage medium 420 may be implemented in a single device or distributed across devices. Likewise, processor 410 may represent any number of processors capable of executing instructions stored by machine-readable storage medium 410. Processor 410 may be integrated in a single device or distributed across devices. Further, machine-readable storage medium 420 may be fully or partially integrated in the same device as processor 410, or it may be separate but accessible to that device and processor 410.

In one example, the program instructions may be part of an installation package. In this case, machine-readable storage medium 420 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 420 may include a hard disk, optical disk, tapes, solid state drives, RAM, ROM, EEPROM, or the like. The executable program instructions in machine-readable storage medium 420 are depicted as collect set of user event data items instructions 421, calculate frame score instructions 422, calculate user session score instructions 423, calculate user experience score instructions 424, and generate visual representation instructions 425.

When executed by processor 410, instructions 421, 422, 423, 424, and 425 may respectively cause computing device 400 to implement blocks 310, 320, 330, 340, and 350 of method 300. Accordingly, computing device 400 may collect a set of user event items, calculate a frame score, calculate a user session score, calculate a user experience score, and generate a visual representation of the user experience score.

Figure 5:
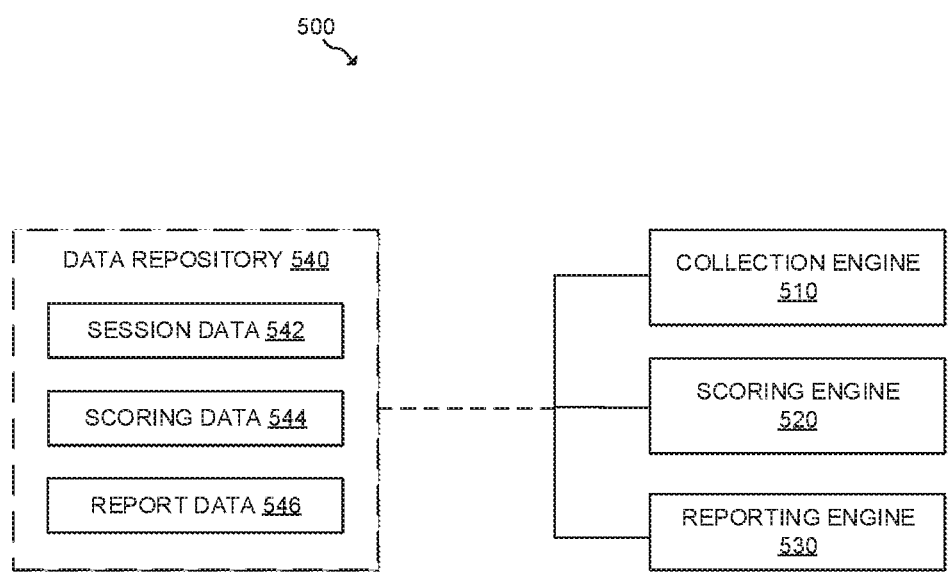
FIG. 5 is a block diagram of an example system for calculating user experience scores.

FIG. 5 is a block diagram depicting experience evaluation system 500. In this example, system 500 includes collection engine 510, scoring engine 520, and reporting engine 530. In performing their respective functions, engines 510-530 may access data repository 540. Repository 540 represents generally any memory accessible to system 500 that can be used to store and retrieve data.

Collection engine 510 is configured to collect a set of user event data items for at least two frames of a user session of a set of user session of an application, where the user event data items represents user experiences from the perspectives of a user device during that frame of the user session. In some examples, each user session is associated with one of a plurality of users, and each user event data item is reflective of an application event from a user device perspective. Looking back at FIG. 1, collection engine 510 may be implemented by calculation component 142 whereby by it collects user event data items reported from agent components 144 operating on user device 112-116. In another example, engine 510 may be implemented by agent components 144 and calculation components 142. In this example, agent components 144 operating on user devices 112-116 detect the initiation of user sessions and each of a series of additional user event data items experienced during those user sessions. The agent components 144 report those user event data items to the calculation components 142. The reporting may be completed as batches at the end of each user session or as a stream occurring during those user sessions. The reporting can include other items such as a user session duration and application environment characteristics such as user identifier, device identifier, device location, operating system, and application version.

Scoring engine 520 is configured to derive one or more scores based upon the user event data items collected for each frame. Derived scores include frame scores, user session scores, and user experience scores. Scoring engine 520 derives each frame score based upon an analysis of the user event data items collected for a corresponding frame of a user session. Scoring engine 520 derives each user session score based upon frame scores for the user session. By averaging user session scores, scoring engine 520 is responsible for calculating user experience scores.

The user event data items collected by collection engine 510 may include response time data items and application fault data items. Each response time data item includes data indicative of an application response time with respect to a user interface action. The data may include the response time itself or data indicating whether the response time fell within or exceeded a threshold duration. Each application fault data item may include data identifying the occurrence of an error or crash. An application fault data item may also include more specific details of a particular error or crash.

In this example, scoring engine 520 is configured to analyze the response and application fault data items of each user session to derive a corresponding frame score. Scoring engine 520 may derive each frame score as a function of a count or a percentage of collected response time data items indicating a response time within a threshold duration. Additionally or in other examples, scoring engine 520 may derive a frame score based on a count of application faults occurring during a corresponding frame. In one example, scoring engine 520 may derive, for frame, a preliminary session score based on the application fault data collected for that session. For example, scoring engine 520 may with a base score of 100 and subtract a penalty calculated based on a count of application faults or failed response times experienced during a given session to arrive at the intermediate score. Scoring engine 520 may then derive the frame score as a function of the intermediate score and a count or percentage of the collected response data items that indicate response times within a threshold duration. For example, the frame score may be derived as a product of the intermediate score and that percentage.

Collected user event data items can be stored as user session data 542. User session data 542 may include data items and scores for each of a plurality of frames for a given user session for a given application. For a given frame, the data may be represented by a time ordered sequence of user event data items. User session data 542 can also include additional information that can identify any of a frame, a user session, user, a user device, a device location, an operating system, and an application version associated with each given user session. The data may also identify a duration of each user session. Value data 544 represents data for use by scoring engine 520 to derive frame and user session scores. Such may include threshold response times and any weighting factors. For example, response times for an application launch may be weighted to affect a frame score more than a response time for a different user interface interaction. In other words, a slow launch time may affect a user session score more than a slow response to the selection of a submit button.

Reporting engine 530 may be configured to report scores derived by scoring engine 520. Scoring engine 520 may store those scores as report data 546 for use by reporting engine 530. Reporting can include communicating selected frame scores, user session scores, time period scores, and user experience scores in electronic messages. Reporting can include posting the scores to a repository where they can be processed to electronically assemble a human readable report such as a dashboard.

As noted, user event data items for each user session may be collected along with application environment indicators. These indicators can include two or more different user devices, two or more different user locations, two or more different operating systems, and two or more different versions of the application. In this example, reporting engine 530 is then configured to report the user, user session, time period, and user experience scores to provide a comparison between two or more selected application environments. Such could include a comparison of scores between two application versions, between two device locations, between two operating systems, or between two user types.

With reference back to FIG. 1, collection engine 510 can be implemented in a number of fashions. Collection engine 510 may be implemented as a client side agent components 144 that reports the user event data items, a server side calculation component 142 that receives the user event data items, or a combination of the two. Scoring and reporting engines 520 and 530 may be implemented in part as a client side agent components 144 and as a server side calculation components 142. Scoring and reporting engines 520 and 530 may be implemented entirely as a server side calculation components 142.

In the foregoing discussion, engines 510-530 were described as combinations of hardware and programming. Engines 510-530 may be implemented in a number of fashions. Looking at FIG. 4, the programming may be processor executable instructions stored on tangible storage medium 420 and the hardware may include processor 410 for executing those instructions. Thus storage medium 420 can be said to store program instructions or code that when executed by processor 410 implements system 500 of FIG. 5.

The foregoing disclosure describes a number of examples for generating recommended inputs for changing an outcome of a predictive model. The disclosed examples may include systems, devices, computer-readable storage media, and methods for generating recommended inputs. For purposes of explanation, certain examples are described with reference to the components illustrated in FIGS. 1-5. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The terminology used herein is for the purpose of describing particular examples and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are used to distinguish one element from another unless stated otherwise or the context indicates otherwise. As used herein, the term "includes" means includes but not limited to, the term "including" means including but not limited to. The term "based on" means based at least in part on.

What is claimed is:

1. A method for execution by a computing device, comprising:
    collecting, for each of at least two frames of each of at least two user sessions of an application, a set of user event data items representing user experiences from a user device perspective during a corresponding frame of the at least two frames of a user session, wherein each of the at least two frames is a finite section of the application;
    calculating a frame score for each of the at least two frames in each of the at least two user sessions by analyzing the frame's set of user event data items, wherein calculating the frame score comprises comparing a ratio of a number of user event data items labeled as positive to a total number of items in the set of user event data items;
    calculating, for each of the at least two user sessions, a user session score by averaging the frame scores for the at least two frames in the user session of the at least two user sessions;
    calculating a user experience score for the application by averaging the user session scores of each of the at least two user sessions; and
    generating a visual representation of the user experience score, the visual representation comprising the user experience score and a score for each category of a set of categories of user event data items.

2. The method of claim 1, wherein, for each of the sets of user event data items, the user experiences comprise response times and application faults experienced during the corresponding frame.

3. The method of claim 1, wherein, when calculating the frame scores, each category of items in the set of user event data items is modified by a weight factor for that category, wherein the weight factor is determined by a user-defined policy.

4. The method of claim 1, wherein each of the frame scores is a function of a count of a respective frame's response time being greater than or less than a threshold duration.

5. The method of claim 1, wherein, for each of the at least two frames in each of the at least two user sessions, the frame score is a function of a count of application faults.

6. The method of claim 1, wherein the score for each category indicates an amount of points lost in the user experience score due to that category.

7. The method of claim 6, wherein the visual representation further comprises:
    session identifiers for each of the at least two user sessions and corresponding user session scores; and
    frame identifiers for frames of the at least two user sessions and corresponding frame scores.

8. A non-transitory machine-readable storage medium encoded with instructions executable by a processor of a computing device to:
    collect, from a user device for each frame of a set of frames of each user session of a set of user sessions of an application, a set of user event data items representing user experiences during a corresponding frame of a user session of the set of user sessions, wherein each frame of the set of frames is a finite section of the application, wherein the user experiences comprise response times and application faults experienced during the corresponding frame;
    calculate a frame score for each of the frames in each of the user sessions by analyzing the frame's set of user event data items, wherein the instructions to calculate the frame score comprises instructions to compare a ratio of a number of user event data items labeled as positive to a total number of items in the set of user event data items;
    calculate, for each user session of the set of user sessions, a user session score by averaging the frame scores for the frames of the set of frames in the user session;
    calculate a user experience score for the application by averaging the user session scores of each of the set of user sessions; and
    generate a visual representation of the user experience score, the visual representation comprising the user experience score and a score for each category of a set of categories of user event data items.

9. The non-transitory machine-readable storage medium of claim 8, wherein, when calculating the frame score for each of the frames, each category of items in the set of user event data items is modified by a weight factor for that category, wherein the weight factor is determined by a user-defined policy.

10. The non-transitory machine-readable storage medium of claim 8, wherein each of the frame scores is a function of a count of a respective frame's response time being greater than or less than a threshold duration.

11. The non-transitory machine-readable storage medium of claim 8, wherein, for each of the frames in each of the user sessions, the frame score is a function of a count of the application faults.

12. The non-transitory machine-readable storage medium of claim 8, wherein the score for each category indicates an amount of points lost in the user experience score due to that category, and wherein the visual representation further comprises:
    session identifiers for user sessions of the set of user sessions and corresponding user session scores; and
    frame identifiers for frames of a user session of the set of user sessions and corresponding frame scores.

13. A computing device for calculating a user experience score for an application, the computing device comprising a processor to:

collect, from a user device for each frame of a set of frames of each user session of a set of user sessions of the application, a set of user event data items representing user experiences during a corresponding frame of a user session of the set of user sessions, wherein each frame of the set of frames is a finite section of the application, wherein the user experiences comprise response times and application faults experienced during the corresponding frame;

calculate a frame score for each of the frames in each of the user sessions by comparing a ratio of a number of user event data items labeled as positive to a total number of items in the set of user event data items;

calculate, for each user session of the set of user sessions, a user session score by averaging the frame scores for the frames of the set of frames in the user session;

calculate the user experience score for the application by averaging the user session scores of each of the set of user sessions; and generate a visual representation of the user experience score, the visual representation comprising the user experience score and a score for each category of a set of categories of user event data items.

14. The computing device of claim 13, wherein each category of items in the set of user event data items is modified by a weight factor for that category, wherein the weight factor is determined by a user-defined policy.

15. The computing device of claim 13, wherein each of the frame scores is a function of a count of a respective frame's response time being greater than or less than a threshold duration.

16. The computing device of claim 13, wherein, for each of the frames in each of the user sessions, the frame score is a function of a count of the application faults.

17. The computing device of claim 13, wherein the score for each category indicates an amount of points lost in the user experience score due to that category.

18. The computing device of claim 17, wherein the visual representation further comprises:
    session identifiers for user sessions of the set of user sessions and corresponding user session scores; and
    frame identifiers for frames of a user session of the set of user sessions and corresponding frame scores.

\* \* \* \* \*